United States Patent [19]

Dunham

[11] Patent Number: 4,925,754
[45] Date of Patent: May 15, 1990

[54] PALLADIUM PLATED CURRENT COLLECTOR

[75] Inventor: Thomas L. Dunham, Dodgeville, Wis.

[73] Assignee: Rayovac Corporation, Madison, Wis.

[21] Appl. No.: 360,829

[22] Filed: Jun. 1, 1989

[51] Int. Cl.⁵ .............................................. H01M 4/66
[52] U.S. Cl. ...................................... 429/245; 429/206
[58] Field of Search ................................ 429/245, 206

[56] References Cited

U.S. PATENT DOCUMENTS

| | | | |
|---|---|---|---|
| 2,861,116 | 11/1958 | Grubb | 429/192 |
| 3,785,868 | 1/1974 | DeVitt | 429/230 |
| 3,939,010 | 2/1976 | Coleman et al. | 429/225 X |
| 3,945,847 | 3/1976 | Kordesch et al. | 429/225 X |
| 4,760,002 | 7/1988 | Schneider et al. | 429/224 X |

Primary Examiner—Stephen J. Kalafut
Attorney, Agent, or Firm—Kenyon & Kenyon

[57] ABSTRACT

An alkaline electrochemical cell is disclosed which comprises a cathode subassembly, with a metal oxide cathode and collector means for collecting current from the cathode, a zinc anode, an electrolyte in contact with the zinc anode and a nonmetallic separator between the cathode and the anode. The collector means comprises a metal plated current collector additionally plated with a layer of palladium. In one embodiment, the metal oxide cathode is a manganese dioxide cathode and the current collector comprises a nickel plated steel clip adapted for holding the metal oxide cathode which has been plated with an additional layer of palladium on surfaces where the clip makes strong gripping contact with the metal oxide cathode. Most preferably, the current collector clip is selectively plated on the inner surface of each leg of the clip with a palladium layer about 3 microinches thick.

8 Claims, 6 Drawing Sheets

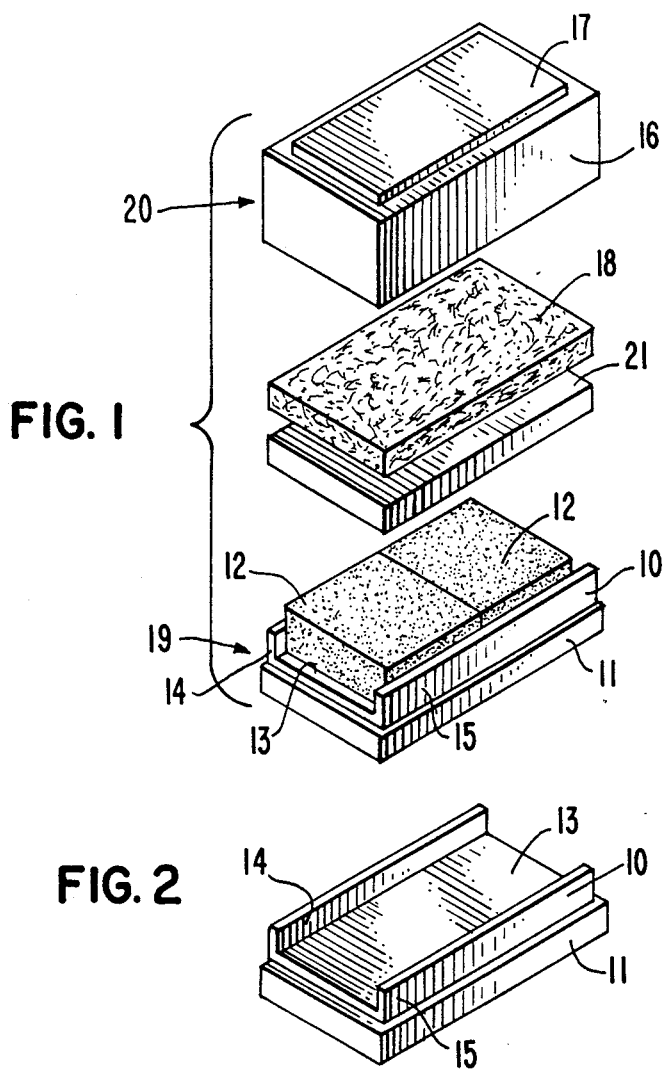
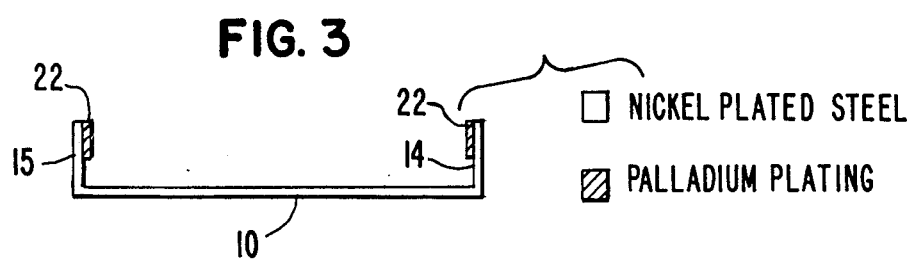
□ NICKEL PLATED STEEL
▨ PALLADIUM PLATING

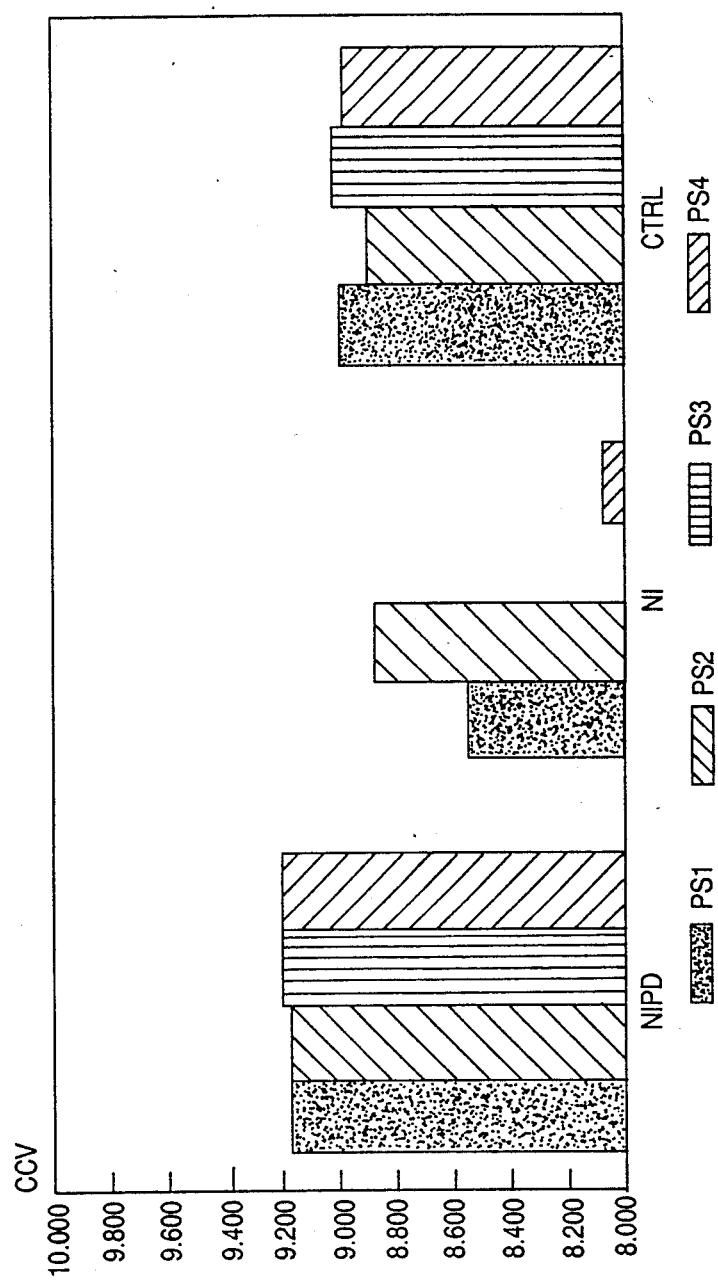

FIG. 5

PRESHIPMENT SAMPLE RESULTS
NICKEL/PALLADIUM CATHODE HOLDERS

| DESCRIPTION | DATE | N | CCVx | CCVsd | AMPx | AMPsd |
|---|---|---|---|---|---|---|
| PS #1 Ni/Pd | 0039 | 110 | 9.169 | .0137 | 4.87 | .068 |
| PS #1 Ni | 0039 | 10 | 8.537 | .0384 | 2.54 | .063 |
| PS #1 CONTROL | 0039 | 20 | 9.015 | .0398 | 3.65 | .210 |
| PS #2 Ni/Pd | 0099 | 26 | 9.146 | .0239 | 4.87 | .167 |
| PS #2 Ni | 0099 | 20 | 8.915 | .0241 | 3.22 | .093 |
| PS #2 CONTROL | 0099 | 31 | 8.906 | .0845 | 3.09 | .382 |
| PS #3 Ni/Pd | 0279 | 120 | 9.181 | .0072 | 4.80 | .093 |
| PS #3 CONTROL | 0279 | 120 | 9.047 | .0525 | 3.63 | .293 |
| PS #4 Ni/Pd | 0689 | 21 | 9.181 | .0060 | 4.61 | .073 |
| PS #4 Ni | 0689 | 20 | 8.067 | .0977 | 1.87 | .087 |
| PS #4 CONTROL | 0689 | 20 | 9.027 | .0581 | 3.42 | .292 |

FIG. 6

EXPERIMENTAL TRIALS
NICKEL/PALLADIUM CATHODE HOLDERS

| DESCRIPTION | DATE | N | CCVx | CCVsd | AMPx | AMPsd |
|---|---|---|---|---|---|---|
| 12 ph Pd | 3508 | 110 | 9.169 | 0.0137 | 4.87 | 0.068 |
| 11.5 ph Pd | 3508 | 114 | 9.165 | 0.0254 | 4.88 | 0.084 |
| 10 ph Pd | 3508 | 112 | 9.166 | 0.0072 | 4.86 | 0.085 |
| CONTROL | 3508 | 116 | 9.077 | 0.0263 | 3.94 | 0.200 |
| 8.9 ph Pd | 3508 | 30 | 9.104 | 0.0123 | 4.79 | 0.141 |
| 9.1 ph Pd | 3508 | 18 | 9.110 | 0.0096 | 4.84 | 0.114 |
| 17 u Pd | 3508 | 22 | 9.105 | 0.0095 | 4.78 | 0.110 |
| 0.2 u Pd | 3508 | 32 | 9.073 | 0.0130 | 4.41 | 0.128 |
| 2.6 u Pd | 3508 | 29 | 9.107 | 0.0092 | 4.80 | 0.106 |

FIG. 7a   PALLADIUM AND GOLD PLATING ON A SULFAMATE NICKEL BASE

INITIAL TARGETS — ROOM TEMPERATURE

| | OCV | | | CCV | | | AMPS | | |
|---|---|---|---|---|---|---|---|---|---|
| | MAX | MIN | MEAN | MAX | MIN | MEAN | MAX | MIN | MEAN |
| CONTROL n=18 | 9.585 | 9.577 | 9.579 | 9.082 | 8.922 | 9.000 | 3.95 | 3.17 | 3.50 |
| NI-PD LEGS n=10 | 9.577 | 9.572 | 9.575 | 9.180 | 9.165 | 9.172 | 4.92 | 4.70 | 4.81 |
| NI-PD ALL n=15 | 9.575 | 9.565 | 9.572 | 9.197 | 9.157 | 9.175 | 5.15 | 4.67 | 4.89 |
| NI-AU LEG n=8 | 9.575 | 9.572 | 9.575 | 9.167 | 9.145 | 9.159 | 4.75 | 4.47 | 4.66 |

6 MONTH TARGETS — ROOM TEMPERATURE

| | OCV | | | CCV | | | AMPS | | |
|---|---|---|---|---|---|---|---|---|---|
| | MAX | MIN | MEAN | MAX | MIN | MEAN | MAX | MIN | MEAN |
| CONTROL n=10 | 9.315 | 9.302 | 9.309 | 8.745 | 8.595 | 8.671 | 3.17 | 2.57 | 2.83 |
| NI-PD LEGS n=7 | 9.315 | 9.305 | 9.310 | 8.890 | 8.825 | 8.868 | 4.30 | 3.80 | 4.09 |
| NI-PD ALL n=12 | 9.320 | 9.237 | 9.307 | 8.920 | 8.820 | 8.888 | 4.60 | 4.15 | 4.32 |
| NI-AU LEG n=5 | 9.315 | 9.252 | 9.294 | 8.705 | 8.510 | 8.620 | 2.85 | 2.20 | 2.56 |

12 MONTH TARGETS — ROOM TEMPERATURE

| | OCF | | | CCV | | | AMPS | | |
|---|---|---|---|---|---|---|---|---|---|
| | MAX | MIN | MEAN | MAX | MIN | MEAN | MAX | MIN | MEAN |
| CONTROL n=10 | 9.215 | 9.200 | 9.208 | 8.620 | 8.427 | 8.540 | 3.10 | 2.50 | 2.77 |
| NI-PD LEGS n=7 | 9.220 | 9.202 | 9.211 | 8.785 | 8.647 | 8.741 | 4.27 | 3.40 | 3.94 |
| NI-PD ALL n=12 | 9.227 | 9.162 | 9.215 | 8.820 | 8.745 | 8.789 | 4.60 | 4.07 | 4.31 |
| NI-AU LEG n=5 | 9.217 | 9.172 | 9.202 | 8.432 | 8.192 | 8.295 | 2.22 | 1.80 | 1.94 |

4,925,754

PALLADIUM PLATED CURRENT COLLECTOR

FIELD OF THE INVENTION

The present invention relates generally to an improved current collector for a metal oxide electrode in an alkaline cell, particularly a cathode current collector plated with palladium.

BACKGROUND OF THE INVENTION

Metal oxide primary cells are generally constructed from a pressed metal oxide (e.g., manganese oxide, MnO2) cathode, an anode prepared from zinc powder and an alkaline electrolyte usually disposed within a separator. All of these components are contained within an appropriate casing or housing. Usually, the current from the cathode is collected from the core by a metallic member such as a portion of the cell steel casing or a metal cathode holder (e.g., a cup or clip) which holds the pressed cathode mass. Constructions of some cells of this type are disclosed in U.S. Pat. Nos. 3,939,010, 3,945,847, 4,125,638, and 4,585,715.

After prolonged storage, the discharge rate of metal oxide cells is substantially reduced below that of freshly prepared cells. This is primarily caused by formation of a poorly conducting oxidized layer on the surface of the current collector. Since the manganese dioxide is in direct contact with the current collector, the metal on the surface of the collector (e.g., nickel) is oxidized forming a layer of metal oxide on the surface of the collector. The presence of such a layer increases the internal resistance of the cell with a concomitant decrease in cell performance.

Others have attempted to solve the collector oxidation problem by employing collector materials which were as inert as possible. In U.S. Pat. No. 2,861,116, platinum, palladium, tantalum, molybdenum, silver, nickel, lead, gold, titanium, zirconium and carbon were used as collector materials. German Pat. No. 1,421,582 found that gold was a preferred (although expensive) collector material. U.S. Pat. No. 4,760,002 teaches the coating of a nickel plated steel collector with a layer of cobalt.

One disadvantage of most of these systems is that they fail to take into account and properly balance considerations of the nobility, expense and solubility of the coating material. For example, use of gold has been found to be ineffective because, although it is a good noble metal, it was very expensive and had a tendency to redissolve in cells causing shorts. In other applications, "degree" of nobility is sacrificed to save expense, usually with a concomitant reduction in immediate and/or longterm cell performance. The present invention provides a cathode current collector which can be manufactured to reduce formation of a resistive oxide layer on the collector surface thus providing increased immediate cell performance without making substantial sacrifices with respect to expense or overall longterm cell performance.

SUMMARY OF THE INVENTION

In accordance with the present invention, an alkaline electrochemical cell is disclosed which comprises a cathode subassembly, with a metal oxide cathode and collector means for collecting current from the cathode, a zinc anode, an electrolyte in contact with the zinc anode and a nonmetallic separator between the cathode and the anode. The collector means comprises a metal plated current collector additionally plated with a layer of palladium. In one embodiment, the metal oxide cathode is a manganese dioxide cathode and the current collector comprise a nickel plated steel clip which is adapted for holding the metal oxide cathode and which has been plated with an additional layer of palladium on surfaces where the current collector makes strong gripping contact with the cathode material (i.e., where contact between the collector and the cathode material is sufficient to eliminate interference in current passage). For example, the current collector clip can be selectively plated on the inner surface of each leg of the clip with a palladium layer about 3 micro inches thick.

BRIEF DESCRIPTION OF THE FIGURES

FIG. 1 is an exploded view of a cell containing a typical cathode/collector assembly for use in cells of the present invention.

FIG. 2 depicts the assembly shown in FIG. 1 from which the pressed cathode material has been removed.

FIG. 3 is a schematic representation (not to scale) of the construction and selective plating of the preferred embodiment of a cathode collector clip used to construct a cell of the present invention.

FIG. 4 is a graph summarizing the comparative performance of cells made in accordance with the present invention and cells having no palladium plating.

FIGS. 5 and 6 are tables summarizing the comparative performance under different plating conditions of cells made in accordance with the present invention and cells having no palladium plating.

FIGS. 7a and 7b constitute a table summarizing the comparative performance of cells without palladium plating and cells having cathode holders which are completely palladium plated and which are plated only on the legs of the holder.

DETAILED DESCRIPTION OF THE INVENTION

Figure 7B:
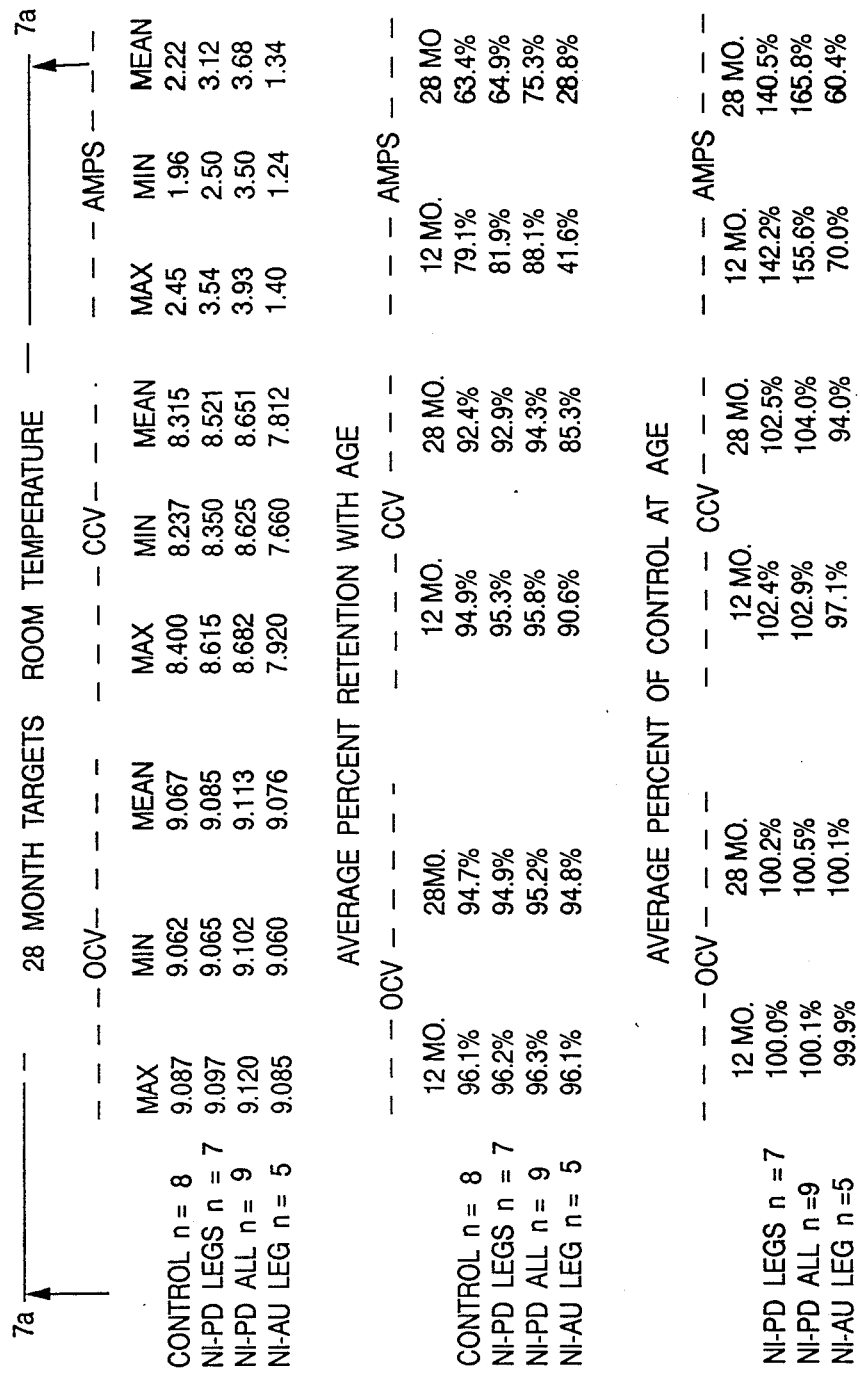

FIGS. 1 and 2 depict one construction of a cell of the present invention and one typical cathode/collector assembly for use in such cells. Clip 10 is joined to case bottom 11 and a cathode terminal (not shown) on the underside of the case bottom by a spot weld through all three parts. Clip 10 holds pressed cathode elements 12 such that the cathode elements 12 are in contact with the upper surface of the face 13 of clip 10 and the inner surfaces of the legs 14 and 15 of clip 10. Contact between clip 10 and cathode elements 12 is greatest on the ends 22 of legs 14 and 15. The ends 22 of legs 14 and 15 achieve strong gripping contact with the cathode material such that interference to current passage from the cathode is decreased and approximately 90% of the current collected from the cathode is collected on the end one third of each leg.

Case body 16 is joined to anode terminal 17 and an internal anode contact (not shown) by another spot weld through all three parts. Anode material 18 is positioned within case body 16 such that contact is made with the internal anode contact. When the cathode assembly 19 and anode assembly 20 are assembled to form the closed cell, separator 21 containing an electrolyte is sandwiched between the anode material 18 and the cathode elements 12 as case bottom 11 is inserted into case body 16 to form the closed cell. The case is then sealed by appropriate means (e.g., resistance welding, solvent bonding, or adhesive). Single cells are then connected in series to form larger finished cells of the desired characteristics. Finally, the combined cells are enclosed in a jacket to produce a finished battery for consumer use.

In one embodiment, the case bottom and case body were made from rigid polyvinyl chloride which was solvent bonded to close the cell case. The anode and cathode terminals and the anode contact were made from nickel plated steel and brass plated steel, respectively. The cathodic composite material was a mixture of manganese dioxide, graphite and binder (polyethylene) in relative weight percent concentrations of 87%, 11% and 2%, respectively. The cathode elements were prepared by compressing this mixture to form cohesive pellets. The anodic composite materials were powdered zinc, potassium hydroxide, mercury and gelling agent (carboxymethyl cellulose) in relative weight percent concentrations of 54%, 43%, 2% and 1%, respectively. The electrolyte was a mixture of zinc oxide (2 wt %) and potassium hydroxide (40 wt %). The separator was a non woven fabric (85% rayon, 15% vinyon).

The clip of the depicted embodiment was composed of nickel plated steel which was selectively plated with an additional layer of palladium. Although other nickel layer thicknesses can be employed, the clip of the depicted embodiment was plated with about 100 microinches of nickel. This represented a reduction in the amount of nickel plating previously deemed necessary to produce effective cells, thus presenting a further reduction in manufacturing expense.

Clips or other collectors used in practicing the present invention can be nickel plated by any means, including without limitation Watts and sulfamate methods. Commercially available nickel-plated collectors can also be used. For example, collectors from Summit Corp. of America, Thomaston, Conn. (Watts and sulfamate plating); All-Rite Spring Co., Chicago, Ill. (Watts plating); Atlantic Precision Spring (sulfamate plating); Amphenol Division, Lysle, Ill. (sulfamate plating); Norbert Plating, Chicago, Ill. (sulfamate plating); and GN Alkaline Batteries A.S., Thisted, Denmark (Watts/Woods strike plating) have been used and found to be suitable.

Any method of palladium plating can be employed in practicing the present invention, although a basic nickel sulfamate process is preferred. The clip can be plated with any thickness of palladium and can also be plated over its entire surface. Platings thicker than approximately 7 microinches were found to provide no additional benefit over lesser thicknesses. Platings thinner than 3 microinches (as low as 0.2 microinches) still showed beneficial effects on cell performance, although the effects were less (4.4 amps as compared to 4.8 amps) and some bleed through was observed. Therefore, considering the cost of palladium, selectively plating at least the end one third of the inner surface of each leg of the clip with about 3 microinches of palladium is sufficient to markedly increase cell performance without using an excess of expensive palladium. This is especially effective and economical since that is the same region where the clip strongly grips the cathode material and 90% of current collection takes place. FIG. 3 schematically represent the plating and selective additional plating of the legs of the preferred embodiment.

In one embodiment, steel clips as depicted in the figures were nickel plated in a bath of nickel sulfamate (450 g/l, 9.6–11.4 volts, 250–300 amps, pH 3.2–3.5, 150° F., time 75–90 minutes). In some instances, plated parts were kept under nitrogen atmosphere to prevent exposure to oxygen. The nickel plated clips were then electro-etched in concentrated sulfuric acid and rinsed in tap water. The clips were then selectively palladium plated, with approximately 3 microinches of palladium on the end one third of the inner surface of each clip leg, in a bath of ATT palladium (6 g/l, 4–6 volts, 300–500 milliamps, pH 8.6–9.1, 125° F., time 30 seconds). Plated parts were collected in a freon or water bath to remove and to recycle excess free palladium.

The selective palladium plating appeared to protect the substrate nickel layer, preventing the formation of tenacious oxides. Since palladium oxide is inherently more conductive than nickel oxide, the rate of build up of internal resistance was decreased. The conductivity (i.e., immediate performance) of the cell was thus improved by maintaining a point contact to the edge of the cathode and collecting current on a palladium protected portion of the clip. Production lots of cells made in accordance with the present invention also showed less variance in closed circuit voltage (especially at high temperature) when compared with control (nickel-plated) cells. No long term reduction in performance due to the addition of palladium was observed.

Various lots of cells were constructed in accordance with the present invention and having the end one third of each leg plated with palladium. Cell performance of such cells was compared to control cells (nickel plated collectors without any palladium; purchased commercially from GN Alkaline Batteries A.S., of Thisted, Denmark) and cells with collector clips which were run through the nickel sulfamate plating process described above without continuing through the palladium bath described above. As shown in FIG. 4 and the table in FIG. 5, the nickel palladium plated cells showed increased closed circuit voltage as compared to cells without the palladium plating.

The amount of palladium applied and the conditions used for plating also can be altered without significantly affecting the increased cell performance resulting from the present invention. The table in FIG. 6 summarizes performance data for cells as above, except that they were produced by varying the pH of the palladium bath between 8.9 and 12 and varying the thickness of the palladium layer from 0.2 microinches to 17 microinches. Although slight variations in performance were observed with varying conditions, all conditions and palladium layer thicknesses exhibited marked improvement over control cells having no palladium plating.

Clips were also plated with additional palladium plating on all surfaces of the clip. Completely plated clips produced open and closed circuit voltages which were greater than or equal to clips plated on the legs alone and controls. Amperage for completely plated clips was slightly higher than leg-plated clips and significantly higher than controls. However, the additional performance with respect to leg plating was deemed to be outweighed by the additional palladium cost for complete plating. The tables in FIG. 7 summarize the comparative performance of complete plating ("NI-PD ALL"), leg plating ("NI-PD LEG") and controls. Some data is also listed in FIG. 7 for performance of clips leg plated with nickel and an additional layer of gold ("NI-AU LEG").

From the foregoing, it will be obvious to those skilled in the art that various modifications in the above described compositions can be made without departing from the spirit and scope of the invention. Accordingly the invention may be embodied in other specific forms without departing from the spirit or essential characteristics thereof. Present embodiments, therefore, are to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. An alkaline electrochemical cell comprising a cathode subassembly, with a metal oxide cathode and collector means for collecting current from said cathode, a zinc anode., an electrolyte in contact with said zinc anode and a nonmetallic separator between the cathode and the anode, said collector means comprising a metal plated current collector additionally plated with a layer of palladium.

2. The electrochemical cell of claim 1 wherein said metal oxide cathode is a manganese dioxide cathode.

3. The electrochemical cell of claim 1 wherein said current collector comprises a nickel plated steel cathode holder adapted for holding said metal oxide cathode.

4. The electrochemical cell of claim 3 wherein said cathode holder is selectively plated with palladium on surfaces where said cathode holder makes strong gripping contact with said metal oxide cathode.

5. The electrochemical cell of claim 3 wherein said cathode holder is a steel clip.

6. The electrochemical cell of claim 5 wherein said clip is selectively plated on the inner surfaces of the legs of said clip.

7. The electrochemical cell of claim 6 wherein said clip is selectively plated on at least the end one third of said, inner surfaces of said legs.

8. The electrochemical cell of claim 6 wherein said clip is selectively plated with a layer of palladium about 3 microinches thick.

* * * * *